(12) United States Patent
Kim et al.

(10) Patent No.: US 10,851,856 B1
(45) Date of Patent: Dec. 1, 2020

(54) CLUTCH CONTROL APPARATUS FOR VEHICLE

(71) Applicants: HYUNDAI MOTOR COMPANY, Seoul (KR); KIA MOTORS CORPORATION, Seoul (KR); INCHEON NATIONAL UNIVERSITY RESEARCH & BUSINESS FOUNDATION, Incheon (KR)

(72) Inventors: Sung Yeol Kim, Suwon-si (KR); Seung Min Lee, Ansan-si (KR); Seok Young Shin, Gunpo-si (KR); Jang Won Lee, Hwaseong-si (KR); Ho Sung Kim, Hwaseong-si (KR); Young Sup Lee, Incheon (KR)

(73) Assignees: HYUNDAI MOTOR COMPANY, Seoul (KR); KIA MOTORS CORPORATION, Seoul (KR); INCHEON NATIONAL UNIVERSITY RESEARCH and BUSINESS FOUNDATION, Incheon (KR)

( * ) Notice: Subject to any disclaimer, the term of this patent is extended or adjusted under 35 U.S.C. 154(b) by 0 days.

(21) Appl. No.: 16/671,816

(22) Filed: Nov. 1, 2019

(30) Foreign Application Priority Data

Jun. 28, 2019 (KR) .......................... 10-2019-0078078

(51) Int. Cl.
*F16D 48/06* (2006.01)
*F16D 48/08* (2006.01)

(52) U.S. Cl.
CPC .... *F16D 48/08* (2013.01); *F16D 2500/30816* (2013.01); *F16D 2500/50293* (2013.01);
(Continued)

(58) Field of Classification Search
CPC ..................... F16D 48/06; F16D 48/08; F16D 2500/30415; F16D 2500/30426;
(Continued)

(56) References Cited

U.S. PATENT DOCUMENTS

2005/0189192 A1* 9/2005 Serebrennikov ........ F16D 48/06
192/30 V
2011/0291850 A1* 12/2011 Sun ........................ G01H 1/003
340/683

(Continued)

FOREIGN PATENT DOCUMENTS

| KR | 10-2004-0036726 A | 4/2004 |
|----|-------------------|--------|
| KR | 10-2016-0005251 A | 1/2016 |
| KR | 10-2016-0005252 A | 1/2016 |

*Primary Examiner* — Edwin A Young
(74) *Attorney, Agent, or Firm* — Brinks Gilson & Lione

(57) ABSTRACT

A clutch control apparatus includes: a judder extractor for extracting a judder component based on a speed of a transmission input shaft; an anti-judder signal generator for generating a basic control signal, which is a reverse phase signal to the judder component, based on the judder component extracted by the judder extractor; a signal separator for separating an amplitude and a phase of the basic control signal received from the anti-judder signal generator; and a signal post-processing device for respectively adjusting the amplitude and the phase output from the signal separator and then combining the same together to output anti-judder torque.

8 Claims, 4 Drawing Sheets

(52) U.S. Cl.
CPC .............. *F16D 2500/70605* (2013.01); *F16D 2500/70668* (2013.01)

(58) Field of Classification Search
CPC . F16D 2500/30816; F16D 2500/50293; F16D 2500/5122; F16D 2500/70605; F16D 2500/7061; F16D 2500/7109; F16D 2500/70668
See application file for complete search history.

(56) References Cited

U.S. PATENT DOCUMENTS

| | | | |
|---|---|---|---|
| 2016/0003312 A1* | 1/2016 | Kim ....................... | F16D 48/06 701/67 |
| 2017/0108060 A1* | 4/2017 | Neuberth ................ | F16D 48/06 |
| 2018/0009430 A1* | 1/2018 | Chung .................... | B60K 1/02 |
| 2018/0087600 A1* | 3/2018 | Tooyama .............. | F16F 15/002 |

\* cited by examiner

US 10,851,856 B1

CLUTCH CONTROL APPARATUS FOR VEHICLE

CROSS REFERENCE TO RELATED APPLICATION

The present application claims priority to and the benefit of Korean Patent Application No. 10-2019-0078078, filed Jun. 28, 2019, the entire contents of which are incorporated herein by reference.

FIELD

The present disclosure relates generally to a clutch control apparatus for a vehicle.

BACKGROUND

The statements in this section merely provide background information related to the present disclosure and may not constitute prior art.

A dual clutch transmission (DCT) or an automated manual transmission (AMT) controls the power input to the transmission by operating a clutch disposed between the transmission and the engine, and thus clutch control performance substantially affects the acceleration and shifting performance of a vehicle. The clutches used in the DCT or AMT are divided into a hydraulically controlled wet clutch and a dry clutch with a simple mechanical operation. In a normal driving situation, the dry clutch is known to have higher power transmission efficiency than the wet clutch, and thus is attracting attention as a technique for improving fuel economy.

However, we have discovered that the dry clutch has a large temperature variation due to friction. Due to such changes in temperature and changes in hardware characteristics over time, the characteristics of the transmission torque vary considerably depending on the control amount of an actuator, which makes the control difficult.

Particularly, in a vehicle equipped with a dry clutch (hereinafter, simply referred to as a 'clutch'), a judder phenomenon caused by a clutch occurs frequently during the acceleration of the vehicle. When the judder phenomenon occurs, the driver feels the vibration of the vehicle, which deteriorates the drivability.

The above-described judder phenomenon is caused by the variation of the transmission torque generated in the clutch. We have found that such variation of the clutch transmission torque is caused by the manufacturing dispersion of the clutch, the friction performance instability of a clutch friction material, or the like, such that it is difficult to fundamentally reduce the judder phenomenon, and even in the same vehicle, the aspect of the judder differs for every acceleration of the vehicle, so it is difficult to control in advance.

The foregoing is intended merely to aid in the understanding of the background of the present disclosure, and is not intended to mean that the present disclosure falls within the purview of the related art that is already known to those skilled in the art.

SUMMARY

The present disclosure proposes a clutch control apparatus for a vehicle, in which when judder is generated in a clutch connecting an engine and a transmission together, the clutch is actively controlled to reduce the judder to prevent or reduce vibration of the vehicle, thereby improving the ride comfort of the vehicle.

In one aspect of the present disclosure, a clutch control apparatus for a vehicle may include: a judder extractor for extracting a judder component from based on a speed of a transmission input shaft; an anti-judder signal generator for generating a basic control signal, which is a reverse phase signal to the judder, based on the judder component extracted by the judder extractor; a signal separator for separating an amplitude and a phase of the basic control signal; and a signal post-processing device for respectively adjusting the amplitude and the phase output from the signal separator and then outputting an anti-judder torque by combining the adjusted amplitude and phase together.

The judder extractor may include a notch filter.

The anti-judder signal generator may include: a reference signal generator for generating a reference signal; and an adaptive least mean square filter for generating the basic control signal based on the reference signal provided from the reference signal generator and the judder component provided from the judder extractor.

The signal post-processing device may include: an amplitude adjuster for changing amplitude by multiplying the amplitude of the basic control signal by an amplitude gain; a phase adjuster for adjusting the phase of the basic control signal; and a combiner for combining an output signal of the amplitude adjuster and an output signal of the phase adjuster together to generate the anti-judder torque.

In order to achieve the above object, according to another aspect of the present disclosure, a clutch control method of a vehicle may include: extracting, by a judder extractor, a judder component based on a speed of a transmission input shaft; generating, by an anti-judder signal generator, a basic control signal, which is a reverse phase signal to the judder component, through adaptive least mean square filtering on the judder component; separating, by a signal separator, an amplitude and a phase of the basic control signal; and generating, by a signal post-processing device, an anti-judder torque after adjusting the separated amplitude and phase, and then combining the adjusted amplitude and phase together.

The method may further include controlling, by a controller, a clutch actuator driving a clutch by adding the anti-judder torque to a target control torque received from the controller.

In generating the basic control signal, the adaptive least mean square filtering may be performed by using the judder component and a repeatedly generated reference signal to generate the basic control signal.

The generating the anti-judder torque include: adjusting the amplitude of the basic control signal by multiplying the amplitude of the basic control signal by an amplitude gain, and adjusting the phase of the basic control signal.

According to the present disclosure, when judder is generated in a clutch connecting an engine and a transmission together, the clutch is actively controlled to reduce the judder to prevent or reduce vibration of the vehicle, thereby improving the ride comfort of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
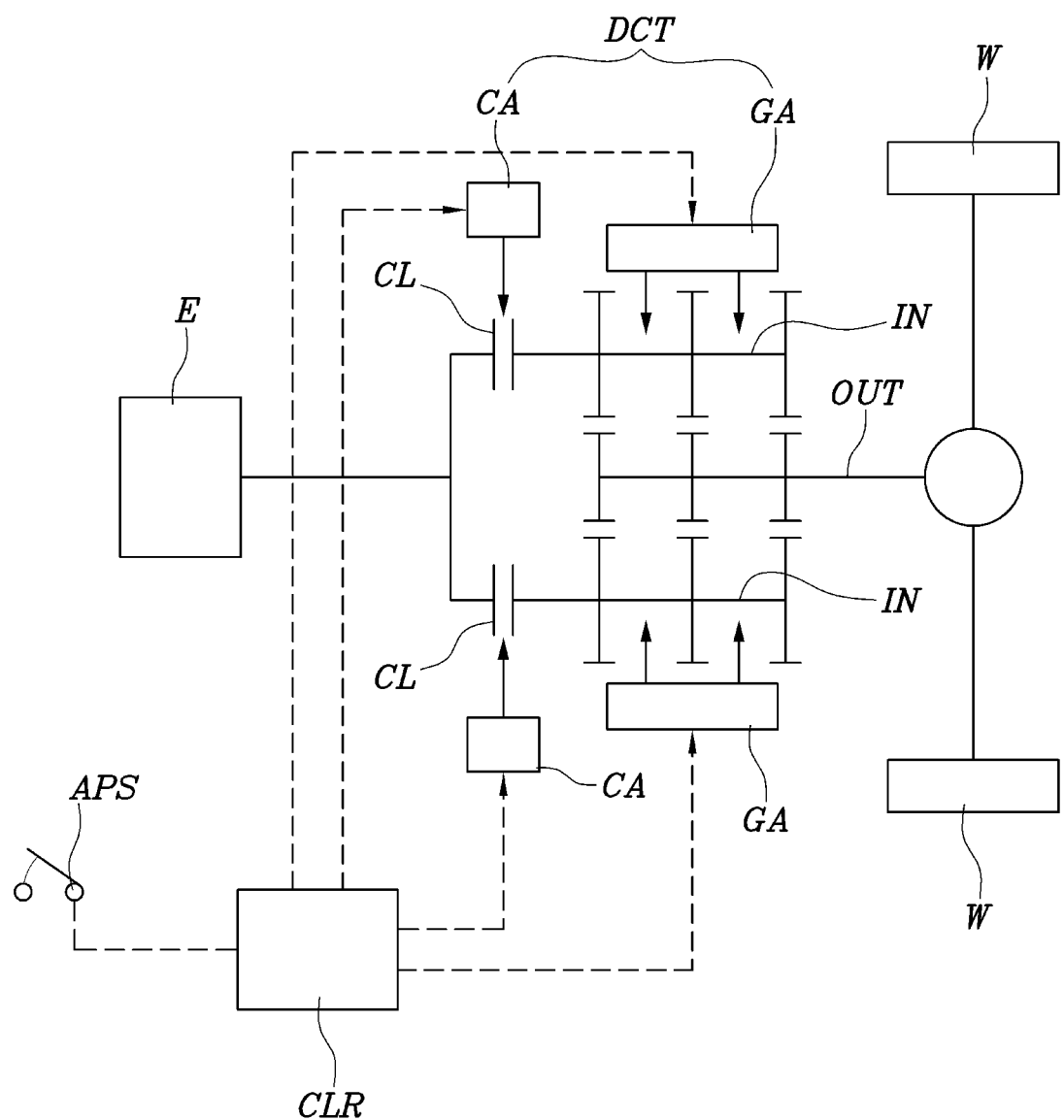
FIG. 1 is a block diagram of a vehicle equipped with a dual clutch transmission (DCT) to which the present disclosure is applicable.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a block diagram of a vehicle equipped with a dual clutch transmission (DCT) to which the present disclosure is applicable, wherein power of an engine E is supplied to two input shafts IN through two clutches CL of the DCT, and the power transferred from the DCT is output to a drive wheel W through an output shaft OUT.

The two clutches CL are driven by respective clutch actuators CA, a gear actuators GA performs shifting by changing transmission gears by selecting and shifting action, the clutch actuators CA and the gear actuators GA are controlled by a controller CLR, and the controller CLR may receive the driver's degree of acceleration pedal operation, etc., wherein in FIG. 1, the controller CLR receives the same through an accelerator position sensor (APS) signal.

Of course, the engine may be configured to be controlled by a separate controller such as an engine control unit (ECU), and the controller CLR, which controls the DCT, may be composed of a transmission control unit (TCU), etc., and the ECU and the TCU may be configured to transmit desired information to each other via a controller area network (CAN).

Figure 2:
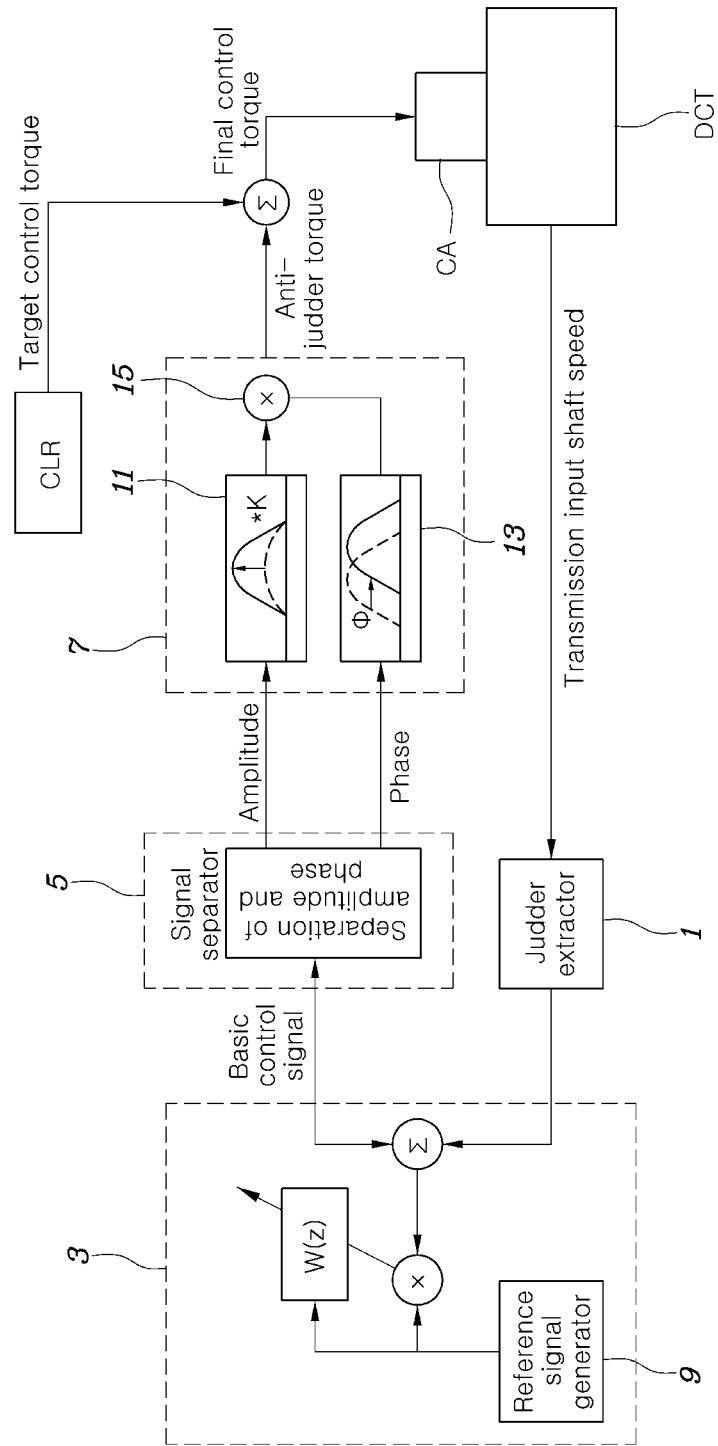
FIG. 2 is a block diagram of a clutch control apparatus for a vehicle according to one form of the present disclosure.

Referring to FIG. 2, a clutch control apparatus for a vehicle according to one form of the present disclosure includes: a judder extractor 1 for extracting a judder component from a transmission input shaft speed; an anti-judder signal generator 3 for generating a basic control signal, which is a reverse phase signal to the judder, by receiving the judder component extracted by the judder extractor 1; a signal separator 5 for separating amplitude and a phase of the basic control signal output from the anti-judder signal generator 3; and a signal post-processing device 7 for respectively adjusting the amplitude and the phase output from the signal separator 5 and combining the same together to output anti-judder torque.

In other words, the clutch control apparatus of the present disclosure is configured such that judder of a clutch is extracted from vibration caused by the speed of an input shaft connected to the clutch; by using the extracted judder component, a basic control signal, which is a reverse phase to the judder signal, is generated; and the amplitude and the phase of the basic control signal are adjusted to generated the anti-judder torque.

Of course, the anti-judder torque is added to target control torque, which is output from the controller CLR by default to control the clutch, to form final control torque so as to be supplied to the clutch actuator, thereby offsetting the judder of the clutch and reducing the same.

The judder extractor 1 may extract the judder component through filtering by receiving the input shaft speed from a speed sensor that measures the speed of the input shaft.

In particular, the judder extractor may include a notch filter, wherein by subtracting the input shaft speed through the notch filter from the speed of the input shaft, judder with little time delay can be extracted.

The anti-judder signal generator 3 includes a reference signal generator 9 for generating a reference signal, and is constituted by an adaptive least mean square filter that generates the basic control signal by using the reference signal provided from the reference signal generator 9 and the judder component provided from the judder extractor 1.

The reference signal generated by the reference signal generator 9 may be formed in a pulse shape repetitive over time, such as a sine wave, and the reference signal generator 9 may be configured to generate the reference signal at a frequency that forms a predetermined relationship (e.g., a predetermined multiple) with the frequency of the judder component extracted by the judder extractor 1.

That the adaptive least mean square filter receives the reference signal and the judder component to generate the basic control signal, which is a reverse phase signal to the judder, may be implemented by adaptive least mean square filtering, which is conventionally known method.

In the signal separator 5, the basic control signal output from the anti-judder signal generator 3 is separated into the amplitude and the phase thereof, and the amplitude and the phase are transferred to the signal post-processing device 7.

The signal post-processing device 7 may include: an amplitude adjuster 11 for changing amplitude by multiplying the amplitude of the basic control signal by an amplitude gain K; a phase adjuster 13 for adjusting the phase W of the basic control signal; and a combiner 15 for combining an output signal of the amplitude adjuster 11 and an output signal of the phase adjuster 13 together to generate the anti-judder torque.

The amplitude gain K used in the amplitude adjuster 11 may be obtained by selecting an appropriate value according to the maximum or average amplitude of the judder, and the phase adjuster 13 may be capable of changing the phase of the basic control signal to effectively offset the judder when the anti-judder torque acts on the clutch through the clutch actuator, taking the phase of the judder and the control delay of the clutch actuator into account.

The combiner 15 adjusts the amplitude and the phase of the basic control signal, respectively, as described above, and then combines the same to generate and output the anti-judder torque.

Of course, the anti-judder torque generated as described above is added to the target control torque, which is provided to the clutch actuator by default from the controller, to form the final control torque so as to be transmitted to the clutch actuator along with the target control torque, so that the component of the anti-judder torque offsets the judder of the clutch.

Herein, the target control torque, which is provided to the clutch actuator CA by default from the controller CLR, refers to a control torque that the controller outputs to control the clutch actuator in order to perform acceleration or shifting of the vehicle without considering the judder of the clutch, which is a conventional way.

Figure 3:
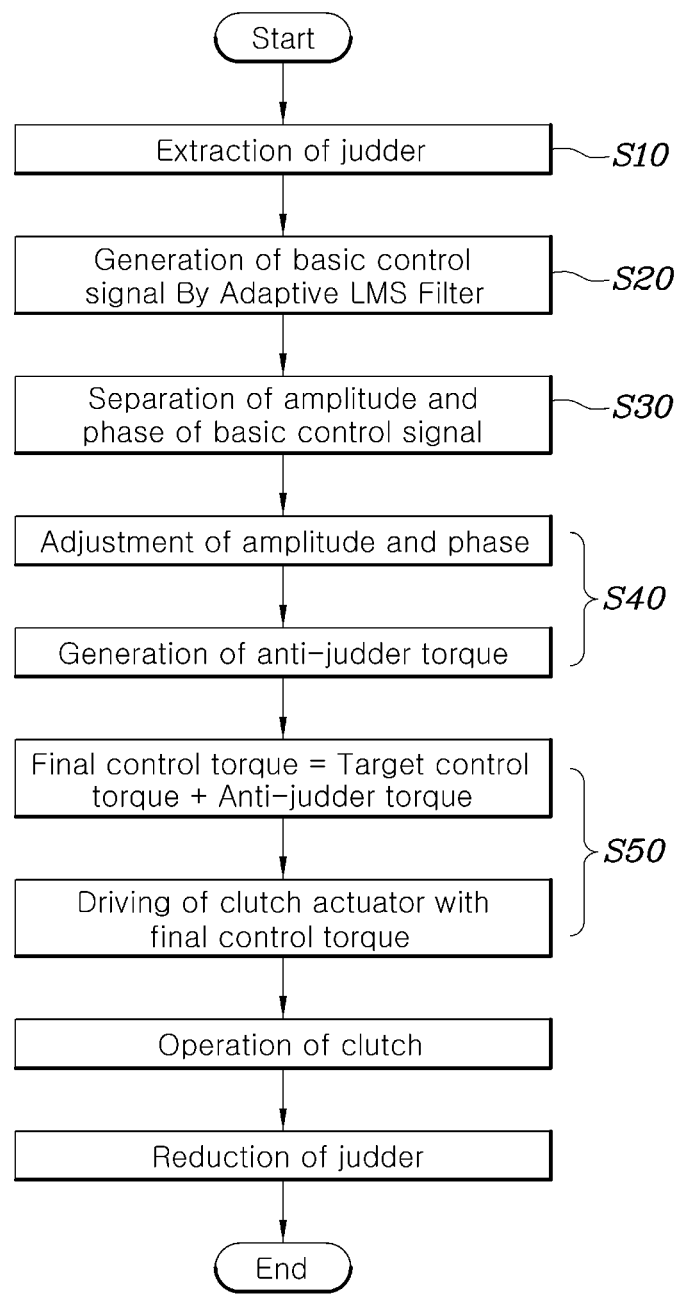
FIG. 3 is a flowchart of a clutch control method of a vehicle according to another form of present disclosure.

Meanwhile, the present disclosure can be expressed as a clutch control method of a vehicle as follows. As shown in FIG. 3, the method includes: an extraction step S10 of extracting a judder component from a transmission input shaft speed; a basic control signal generation step S20 of generating a basic control signal, which is a reverse phase signal to the judder, through adaptive least mean square filtering by receiving the judder component; a separation step S30 of separating amplitude and a phase of the basic control signal; an anti-judder torque generation step S40 of respectively adjusting the separated amplitude and phase and then combining the same together to generate anti-judder torque; and a control step S50 of adding the anti-judder torque to target control torque, which is output from the controller controlling the clutch, so as to control a clutch actuator driving the clutch.

In the basic control signal generation step S20, adaptive least mean square filtering is performed by using the judder component and the repeatedly generated reference signal to generate the basic control signal.

In the anti-judder torque generation step S40, after amplitude is adjusted by multiplying the amplitude of the basic control signal by an amplitude gain, and the phase of the basic control signal is separately adjusted, the anti-judder torque is generated by combining the amplitude and the phase.

Figure 4A:
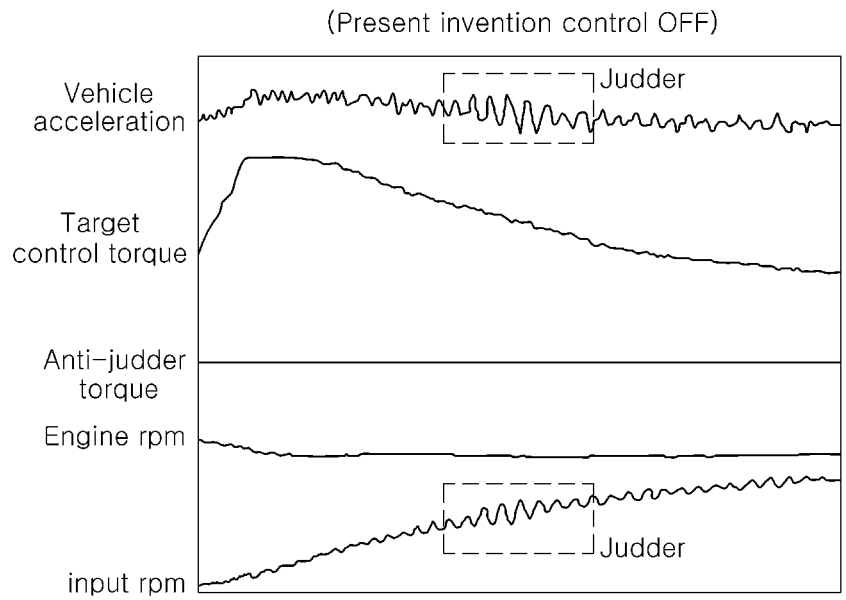
FIG. 4A is a graph when an anti-judder torque is not applied.
Figure 4B:
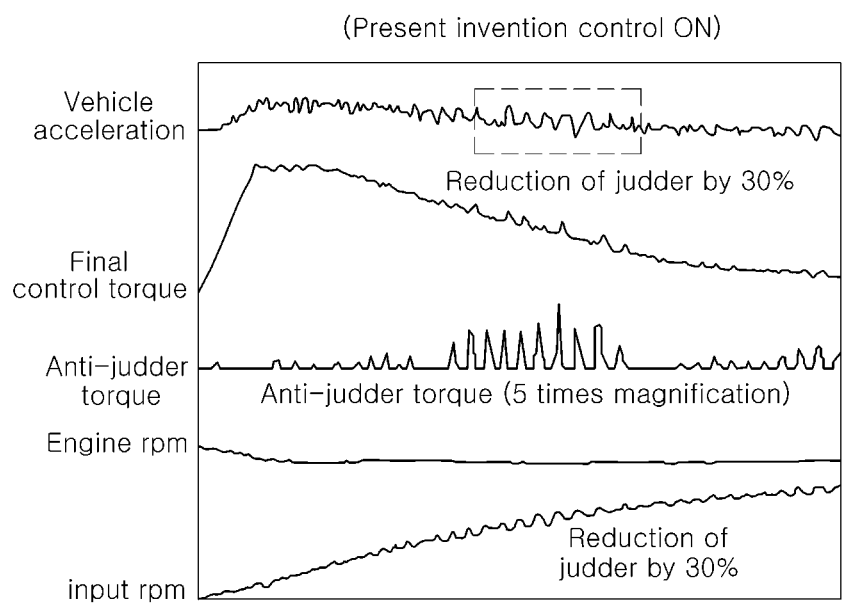
FIG. 4B is a graph when an anti-judder torque is applied.

FIGS. 4A and 4B are graphs to illustrate the effect of the present disclosure as described above. FIG. 4A is a graph where anti-judder torque of the present disclosure is not applied, and vibration occurs in the acceleration of the vehicle due to judder which is generated by variation of transmission input shaft speed, so the ride comfort is deteriorated because an occupant feels vibration. However, as illustrated in FIG. 4B, when anti-judder torque according to the present disclosure is applied, the application of the anti-judder torque improves the ride comfort of the vehicle by reducing variation of the transmission input shaft speed and the acceleration vibration of the vehicle by about 30%.

For reference, in the graph where the anti-judder torque is applied, the anti-judder torque is more easily recognized by showing the anti-judder torque by 5 times magnification.

Although the present disclosure is described with reference to specific items such as specific structural elements, to merely some forms, and to drawings, such specific details disclosed herein are merely representative for purposes of helping more comprehensive understanding of the present disclosure. The present disclosure, however, is not limited to only the example forms set forth herein, and those skilled in the art will appreciate that the present disclosure can be embodied in many alternate forms.

What is claimed is:

1. A clutch control apparatus for a vehicle, the apparatus comprising:
  a judder extractor configured to extract a judder component based on a speed of a transmission input shaft;
  an anti-judder signal generator configured to generate a basic control signal based on the judder component extracted by the judder extractor, wherein the basic control signal is a reverse phase signal to the judder component;
  a signal separator configured to separate an amplitude and a phase of the basic control signal; and
  a signal post-processing device configured to respectively adjust the amplitude and the phase output from the signal separator and configured to output an anti-judder torque by combining the adjusted amplitude and phase together.

2. The apparatus of claim 1, wherein the judder extractor includes a notch filter.

3. The apparatus of claim 1, wherein the anti-judder signal generator includes:
  a reference signal generator configured to generate a reference signal; and
  an adaptive least mean square filter configured to generate the basic control signal based on the reference signal provided from the reference signal generator and the judder component provided from the judder extractor.

4. The apparatus of claim 3, wherein the signal post-processing device includes:
  an amplitude adjuster configured to multiply the amplitude of the basic control signal by an amplitude gain so as to change the amplitude;
  a phase adjuster configured to adjust the phase of the basic control signal; and
  a combiner configured to combine an output signal of the amplitude adjuster and an output signal of the phase adjuster together to generate the anti-judder torque.

5. A clutch control method for a vehicle, the method comprising:
  extracting, by a judder extractor, a judder component based on a speed of a transmission input shaft;
  generating, by an anti-judder signal generator, a basic control signal, which is a reverse phase signal to the judder component, through adaptive least mean square filtering on the judder component;
  separating, by a signal separator, an amplitude and a phase of the basic control signal; and
  generating, by a signal post-processing device, an anti-judder torque after adjusting the separated amplitude and phase, and then combining the adjusted amplitude and phase together.

6. The method of claim 5, further comprising:
  controlling, by a controller, a clutch actuator configured to drive a clutch by adding the anti-judder torque to a target control torque received from the controller.

7. The method of claim 6, wherein in generating the basic control signal, the adaptive least mean square filtering is performed by using the judder component and a repeatedly generated reference signal to generate the basic control signal.

8. The method of claim 6, wherein generating the anti-judder torque includes:
  adjusting the amplitude of the basic control signal by multiplying the amplitude of the basic control signal by an amplitude gain; and
  adjusting the phase of the basic control signal.

* * * * *